Aug. 14, 1928.

W. H. SAUVAGE

REGULATOR FOR BRAKE RIGGING

Filed Nov. 1, 1927

1,681,058

INVENTOR.
William H. Sauvage
BY
ATTORNEY.

Patented Aug. 14, 1928.

1,681,058

UNITED STATES PATENT OFFICE.

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE.

REGULATOR FOR BRAKE RIGGING.

Application filed November 1, 1927. Serial No. 230,350.

This invention relates to regulators for foundation brake rigging as applied to railway vehicles and may be used in conjunction with any one of the several levers of the brake gear having a relatively fixed point of support, whereby that point of support may be manually adjusted when desired to re-establish the entire brake rigging into proper relative position to insure predetermined piston travel and proper brake shoe clearance.

One of the objects of the present invention is to provide a simple and practical mechanism of the above general character which will be substantially fool-proof in operation as well as strong and durable in construction.

A further object is to provide a regulator of the above character having few parts which may be inexpensively manufactured and assembled and which may be applied to brake rigging now in general use without material alteration or substitution of parts.

A further object is to provide a mechanism of the above general character which is well adapted to withstand the shocks to which it is subjected in emergency application, and which is not likely to get out of order due to accumulation of dust and dirt.

Other objects will be in part obvious from the annexed drawings and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the views, in which—

Figure 2:
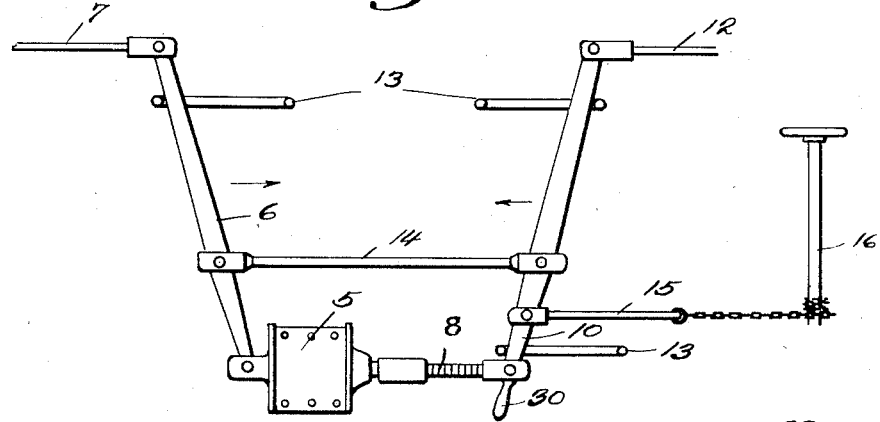
Fig. 2 is a diagrammatic view showing one of the various applications in which the regulator may be used.

As is known to those familiar with this art, it is always desirable to have proper brake shoe clearance as well as uniform piston travel. Considering the present invention from the point of view of its application to the cylinder mechanism of the foundation brake gear, as indicated in Fig. 2, the cylinder is indicated at 5 and is provided with a dead cylinder lever 6 having a connection with a pull rod 7 extending to the truck brake rigging at one end of the car. The cylinder is provided with a piston rod 8 cooperating with one end of the live cylinder lever 10, the opposite end of which lever is connected with pull rod 12 leading to the opposite truck brake rigging. The levers 6 and 10 are supported in any desired type of brackets, sill slots, or hangers indicated at 13, which provide limiting stop means therefor, and are also connected by a tie rod 14. A second pull rod 15 may be connected to the live cylinder lever 10 and its opposite end to a brake staff diagrammatically indicated at 16.

Figure 1:
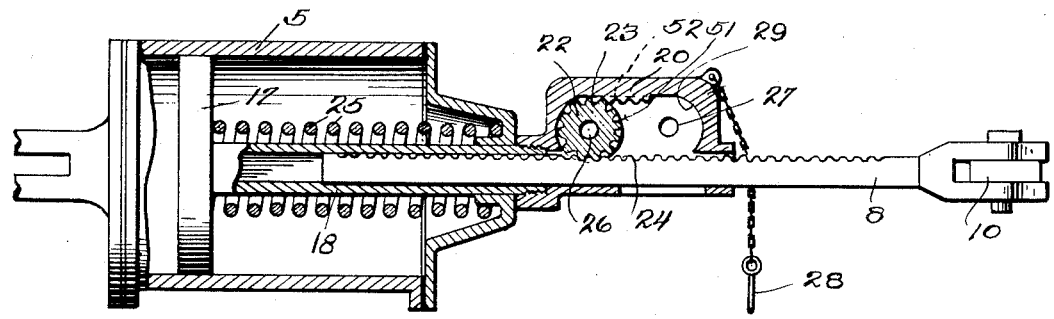
Fig. 1 is a detail sectional view showing such parts of the entire mechanism as is necessary to fully understand the invention.

In Fig. 1, there is shown the details of construction of the cylinder and regulator. Within the cylinder is a piston 17 having a telescopic piston rod, to the outer end of the tubular portion 18 of which is threaded a casing 20 forming a chamber containing the regulator mechanism. This casing is preferably made in one part and is provided with an opening on its under side for assembling the parts contained therein and also prevent accumulation of dust and dirt. Within the chamber or casing 20 is a pinion 22 adapted to mesh with an interrupted rack 23 on the upper inside portion of the chamber 20 and with a rack 24 on the telescoping piston rod 8. Surrounding the tubular member 18 within the cylinder 5, is a coil spring 25 acting between the piston 17 and the non-pressure head of the said cylinder. The pinion 22 is provided with a central hole 26 which is adapted to register with a hole 27 in the side walls of the casing or housing 20 thereby to be engaged by a pin or key 28, when it is desired to hold the pinion in out of mesh or release position.

As shown in Fig. 1, the parts may be assumed to be in normal operative position with the brakes ready to be applied when air is admitted to cylinder 5. The piston 17 moves towards the right and, by reason of the threaded connection between the piston rod 18 and housing 20, causes the said housing to move with it. By reason of the rack and pinion connection above described, piston rod 8 will be forcibly moved with the casing 20 to the right to actuate lever 10 and associated brake rigging. Likewise, on release of the brakes, the live lever 10 is moved back to its normal position under the action of gravity and a brake lever return spring when used, and the piston 17 is restored to its normal position by reason of the coiled spring 25.

In order to regulate the brakes to take up and permanently hold any excess travel and at the same time insure predetermined brake shoe clearance, the operator grasps a handle 30, forming an extension on live cylinder lever 10, Fig. 2, and moves the same forcibly to the right. This movement does not in any way disturb the normal position of the cylinder piston but causes the pinion 22 to roll along the racks 23 and 24 until the pinion reaches the right hand side of the chamber 20. It will be noted that the rack 23 is interrupted and there is consequently formed in the casing 20 an enlarged portion 29, in which the pinion may freely rotate relative to the casing. If there is then any excess travel to be absorbed over and above brake shoe clearance, the pinion 22 will rotate freely and advance along the teeth of rack 24 to take up all of the excess travel, whereupon the handle is released. The pinion 22 upon such release rolls back along the racks 23 and 24 to its normal position of rest and thereafter holds rod 8 in its newly adjusted position. It will be understood that the distance between the holes 26 and 27 when the pinion 22 is at its normal innermost position (Fig. 1) is proportional to the total normal and desired brake shoe clearance, or piston travel. Consequently, if this distance is accurately obtained, the desired piston travel is also obtained.

By reference to Fig. 2, it will be noted that the regulation as described by actuation of the lever extension 30, is similarly effected in the same manner upon application of the hand brake 16. Since the hand brakes are operated many more times than the power brakes, it will be obvious that perfect regulation will be maintained at all times.

Figure 3:
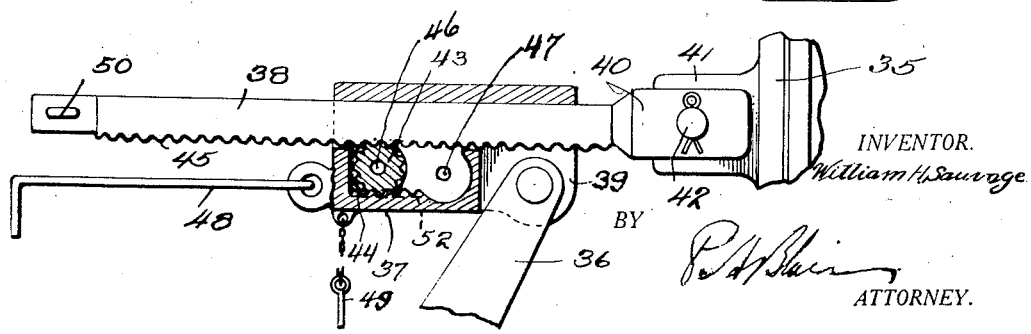
Fig. 3 is a detail, partly in section, showing the invention as applied to another part of the brake rigging.

In Fig. 3, substantially the same type of regulator is applied to one side of the truck bolster 35 and serves as the normal fixed support for the upper end of the dead lever 36. The regulator here comprises a casing 37 arranged on a ratchet bar or rod 38 having its bifurcated jaw portion 40 straddling a yoke 41 extending from the bolster and maintained thereon by a pin 42 or the like. The casing 37 is provided with ears 39 to which the dead lever is pivotally connected, but otherwise conforms generally to the casing 20 of Fig. 1 and has mounted therein a pinion 43 meshing with an interrupted rack 44 and rack teeth 45 of the casing and ratchet bar 38 respectively. The distance between holes 46 and 47 is, as in the construction heretofore described, proportional to total brake shoe clearance. When an operating handle 48 connected to the casing 37 is actuated to the left, the pinion 43 rolls along the rack on the bar 38 and the interrupted rack portion until it reaches the dead space in the right end of the casing, whereupon the bar 38 may be moved relatively thereto to take up all excess travel of the brakes.

To release the regulator, the rod 48 is pulled out the distance of brake shoe clearance and the taper key 47 is inserted thru the registering pinion and casing holes 46—47, thus holding the pinion out of mesh with the ratchet bar 45, and the casing may then move back to its full release position, after which the pin 49 is withdrawn. If adjustment has been made after new shoes are applied, the pinion 43 upon first application of the brakes rolls back along its coacting racks 44 and 45 until it reaches the position shown in Fig. 3. The lost motion movement permitted thereby insures proper brake shoe clearance.

It will be, of course, understood that the form of regulator should be used with the general type of brake gear shown in my prior Patent, No. 1,612,781, dated December 28, 1926, in so far as the hanger or limiting means for the cylinder levers are concerned. The casing 37 is preferably made in one part for convenience of assembly and the under side may be suitably cut away as shown in Fig. 1 in order that the pinion 43 may be inserted into the casing. It is desirable that a stop cotter 50 be provided at the outermost end of the bar 38 to limit the movement of the casing 37 thereon.

Figure 4:
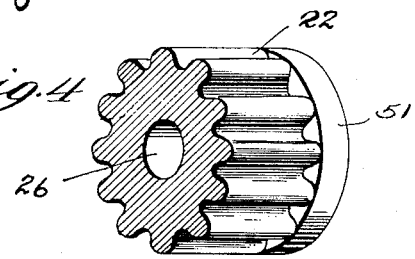
Fig. 4 is a detail perspective, in section, of one of the parts.

Referring to Fig. 4, the pinions 22 and 43 are provided with end rims 51 which coact with suitable tracks 52 formed at each side in casings 20 and 37 to strengthen the teeth and aid in free rotation of the pinion.

From the above, it will be seen that the present invention provides a reliable and efficient mechanism of simple and practical construction and well adapted to accomplish among other all of the advantages and objects herein set forth.

Without further analysis the foregoing will so fully reveal the gist of this invention that others can by applying current knowledge readily adapt it for various applications without omitting certain features that, from the standpoint of the prior art, fairly constitutes essential characteristics of the generic or specific aspects of this invention, and therefore such adaptations should and are intended to be comprehended within the meaning and range of equivalency of the following claims:

1. In combination with a brake rigging, a lever having a normally fixed point of support, means for changing said fixed point of support comprising a rod operatively associated with said lever and having a rack thereon, a casing enclosing a portion of said rod and rack and having therein a rack surface, and a pinion mounted in said casing and meshing with both of said racks, one of the racks being interrupted, whereby the pinion may rotate free on said interrupted rack while in mesh with the other rack.

2. In combination with a brake rigging, a lever having a normally fixed point of support, means for changing said fixed point of support comprising a rod operatively associated with said lever and having a rack surface, a casing enclosing a portion of said rack surface and having therein a rack surface extending substantially parallel to said first-named surface, said last named rack surface being interrupted at one end of said casing, and a pinion in said casing cooperating with both of said rack surfaces and adapted to be rotated out of meshing engagement with said interrupted rack surface upon movement of said rod, whereby the angular relation between the lever and rod may be varied.

3. In combination with a brake rigging, a lever having a normally fixed point of support, means for changing said fixed point of support comprising a rod operatively associated with said lever and having a rack surface, a casing enclosing a portion of said rack surface and having therein a rack surface extending substantially parallel to said first-named surface, said last named rack surface being interrupted at one end of said casing, and a pinion in said casing cooperating with both of said rack surfaces and adapted to be rotated out of meshing engagement with said interrupted rack surface upon movement of said rod, whereby the relative relation between the lever and rod may be varied, said pinion and casing having openings which are adapted to register when the pinion is disengaged from the interrupted rack surface, whereby the pinion may be held out of meshing engagement with the said first-named rack surface to permit the rod to be returned to initial position.

4. In combination with a brake rigging, a lever having a normally fixed point of support, means for changing said fixed point of support comprising a rod operatively associated with one end of the lever, and having a rack surface thereon, a casing surrounding a portion of said rod and rack surface and having a chamber therein, a rack formed inside said casing, and a pinion arranged within said casing to mesh with the racks, whereby upon movement of the rod relative to said casing the pinion will roll along the rack portion of the casing, said last-mentioned rack portion being interrupted to form a part of said chamber into which said pinion is adapted to roll whereby further movement of the rod relative to the casing may take place.

5. In a foundation brake gear including an air cylinder, a piston therein, levers associated with said cylinder and limiting stop means therefor, and a hand brake mechanism connected to one of said cylinder levers, the combination of a regulator in which one end of said cylinder lever has a normally fixed point of support, said regulator including a means for changing said point of support thereby to adjust the brake gear into proper position to insure predetermined piston travel and brake shoe clearance, said regulator being operative upon each application of the hand brake mechanism, and other means to actuate said regulator manually when desired.

6. In a foundation brake gear including an air cylinder, a piston therein, a piston rod, levers associated with said cylinder and piston rod and stop limiting means therefor, and a hand brake mechanism connected to one of said cylinder levers, the combination of a regulator in which said cylinder lever has a normally fixed point of support, said regulator comprising a housing thru which said piston rod extends, means in said housing to change the relative position of said piston rod with respect to said housing upon excess application of the brakes an amount equal to such excess application, said regulator being operative upon each application of the hand brake mechanism, and other means to actuate said regulator manually when desired.

7. In a foundation brake gear including an air cylinder, a piston therein, a piston rod, levers associated with said cylinder and piston rod and limiting stop means therefor, and a hand brake mechanism connected to one of said cylinder levers, the combination of a regulator in which said cylinder lever has a normally fixed point of support, said regulator comprising a housing thru which said piston rod extends, a rack and pinion connection between said housing and said piston rod operative to change the relative position of said piston rod with respect to said housing upon excess application of the brakes, said regulator being operative upon each application of the hand brake mechanism, and other means to actuate said regulator manually when desired.

8. In a foundation brake gear including an air cylinder, a piston therein, levers associated with said cylinder, a hand brake mechanism connected to one of said levers, and a regulator interposed between one of said levers and said cylinder whereby their relative position is changed on each manual application of the brakes when excess piston travel exists, said means including a rack and pinion mechanism with means for holding them against excess relative movement when the brakes are released and after excess piston travel has been absorbed.

Signed at New York, New York, this 11th day of October, 1927.

WILLIAM H. SAUVAGE.